United States Patent
Wada et al.

(10) Patent No.: US 12,030,490 B2
(45) Date of Patent: Jul. 9, 2024

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Koichiro Wada, Wako (JP); Sho Tamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 224 days.

(21) Appl. No.: 17/681,858

(22) Filed: Feb. 28, 2022

(65) Prior Publication Data

US 2022/0306098 A1   Sep. 29, 2022

(30) Foreign Application Priority Data

Mar. 29, 2021 (JP) .................................. 2021-054893

(51) Int. Cl.
   *B60W 30/12*  (2020.01)
   *B60W 10/20*  (2006.01)
   (Continued)

(52) U.S. Cl.
   CPC ............ *B60W 30/12* (2013.01); *B60W 10/20* (2013.01); *B60W 30/143* (2013.01);
   (Continued)

(58) Field of Classification Search
   CPC .... B60W 30/12; B60W 10/20; B60W 30/143; B60W 40/06; B60W 2420/42;
   (Continued)

(56) References Cited

U.S. PATENT DOCUMENTS 5,414,625 A * 5/1995 Hattori ................. G05D 1/0274
                                          701/28
9,545,922 B1 * 1/2017 Sim ....................... B60W 30/12
(Continued)

FOREIGN PATENT DOCUMENTS

JP        08-044999         2/1996
JP        2009-134455       6/2009
(Continued)

OTHER PUBLICATIONS

Japanese Office Action for Japanese Patent Application No. 2021-054893 mailed Nov. 8, 2022.

*Primary Examiner* — Sizo B Vilakazi
*Assistant Examiner* — Brian R Kirby
(74) *Attorney, Agent, or Firm* — Amin, Turocy & Watson, LLP

(57) ABSTRACT

A vehicle control device includes a storage device configured to store a program, and a hardware processor. The hardware processor executes the program stored in the storage device to recognize a surrounding situation of a vehicle including a road division line and a surrounding vehicle, to control steering and acceleration/deceleration of the vehicle based on at least the road division line without depending on an operation of a driver of the vehicle, and to determine whether occlusion, in which at least a part of the road division line is shielded, has occurred, based on the road division line and a position of the surrounding vehicle present in front of the vehicle.

6 Claims, 6 Drawing Sheets

(51) Int. Cl.
  *B60W 30/14* (2006.01)
  *B60W 40/06* (2012.01)
  *B62D 15/02* (2006.01)
  *G06V 20/56* (2022.01)

(52) U.S. Cl.
  CPC ......... *B60W 40/06* (2013.01); *B62D 15/0255* (2013.01); *B62D 15/026* (2013.01); *G06V 20/588* (2022.01); *B60W 2420/403* (2013.01); *B60W 2552/53* (2020.02); *B60W 2554/80* (2020.02); *B60W 2556/10* (2020.02)

(58) Field of Classification Search
  CPC ......... B60W 2552/53; B60W 2554/80; B60W 2556/10; B60W 30/16; G06V 20/588; G05D 2201/0213; G05D 1/0223
  USPC .......................................................... 701/41
  See application file for complete search history.

(56) References Cited

U.S. PATENT DOCUMENTS

| | | | | |
|---|---|---|---|---|
| 2009/0030613 A1* | 1/2009 | Kataoka | ............... | G06V 20/588 701/300 |
| 2010/0121561 A1* | 5/2010 | Kodaira | ............... | G06V 20/588 382/104 |
| 2011/0144859 A1* | 6/2011 | Suk | ...................... | G06V 20/588 382/104 |
| 2012/0121183 A1* | 5/2012 | Joshi | ...................... | G06V 10/26 382/191 |
| 2013/0190984 A1* | 7/2013 | Kawai | ...................... | B62D 6/00 701/41 |
| 2014/0200801 A1* | 7/2014 | Tsuruta | ............... | B60W 60/001 701/400 |
| 2015/0227800 A1* | 8/2015 | Takemae | ............... | G06V 20/588 382/104 |
| 2019/0241184 A1* | 8/2019 | Hayashi | ............... | G05D 1/0223 |
| 2019/0299988 A1* | 10/2019 | Sato | ..................... | B62D 15/026 |

FOREIGN PATENT DOCUMENTS

| | | | | |
|---|---|---|---|---|
| JP | 2009134455 A | * | 6/2009 | |
| JP | 2009-143309 | | 7/2009 | |
| JP | 2012-123495 | | 6/2012 | |
| JP | 6614353 | | 12/2019 | |
| WO | WO-2016117507 A1 | * | 7/2016 | ......... G06K 9/00798 |

* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2021-054893, filed Mar. 29, 2021, the content of which is incorporated herein by reference.

BACKGROUND

Field of the Invention ii

The present invention relates to a vehicle control device, a vehicle control method, and a storage medium.

Description of Related Art

A technology for generating a virtual road division line for a lane in which a host vehicle is traveling is known. For example, Japanese Patent No. 6614353 discloses a technology for generating a virtual road division line based on the position of a preceding vehicle when a road division line is missing.

SUMMARY

However, the technology disclosed in Japanese Patent No. 6614353 does not consider a case where a surrounding vehicle enters a lane in which a host vehicle is traveling and a road division line of the lane is missing. As a consequence, the accuracy of recognition of the road division line when the surrounding vehicle enters the lane in which the host vehicle travels may be low.

The present invention is achieved in view of the problems described above, and one object of the present invention is to provide a vehicle control device, a vehicle control method, and a storage medium, by which it is possible to improve the accuracy of recognition of a road division line when a surrounding vehicle enters a lane in which a host vehicle is traveling.

A vehicle control device, a vehicle control method, and a storage medium according to the invention employ the following configurations.

(1) A vehicle control device according to an aspect of the invention includes: a storage device configured to store a program; and a hardware processor, wherein the hardware processor executes the program stored in the storage device to recognize a surrounding situation of a vehicle including a road division line and a surrounding vehicle, to control steering and acceleration/deceleration of the vehicle based on at least the road division line without depending on an operation of a driver of the vehicle, and to determine whether occlusion, in which at least a part of the road division line is shielded, has occurred, based on the road division line and a position of the surrounding vehicle present in front of the vehicle.

(2) In the above aspect (1), when it is determined that the occlusion has occurred, the hardware processor controls the steering and the acceleration/deceleration of the vehicle, based on the road division line recognized in the past.

(3) In the above aspect (1), the hardware processor determines whether a distance between the surrounding vehicle and the road division line is equal to or smaller than a first threshold, and determines whether the occlusion has occurred, based on whether the distance is equal to or smaller than the first threshold.

(4) In the above aspect (3), the hardware processor defines a perpendicular line to the road division line from the surrounding vehicle on an assumed plane virtually viewed from the sky, and uses a length of the perpendicular line as the distance.

(5) In the above aspect (3), the hardware processor calculates a degree of deviation indicating a deviation between the road division line currently recognized and the road division line recognized in the past, and determines that the occlusion has occurred when the distance is equal to or smaller than the first threshold and the degree of deviation is equal to or more than a second threshold.

(6) A vehicle control method according to another aspect of the invention is implemented by a computer that recognizes a surrounding situation of a vehicle including a road division line and a surrounding vehicle, controls steering and acceleration/deceleration of the vehicle based on at least the road division line without depending on an operation of a driver of the vehicle, and determines whether occlusion, in which at least a part of the road division line is shielded, has occurred, based on the road division line and a position of the surrounding vehicle present in front of the vehicle.

(7) A non-transitory computer readable storage medium storing a program according to another aspect of the invention causes a computer to recognize a surrounding situation of a vehicle including a road division line and a surrounding vehicle, to control steering and acceleration/deceleration of the vehicle based on at least the road division line without depending on an operation of a driver of the vehicle, and to determine whether occlusion, in which at least a part of the road division line is shielded, has occurred, based on the road division line and a position of the surrounding vehicle present in front of the vehicle.

According to (1) to (7), it is possible to improve the accuracy of recognition of a road division line when a surrounding vehicle enters a lane in which a host vehicle travels.

DESCRIPTION OF EMBODIMENTS

Hereinafter, an embodiment of a vehicle control device, a vehicle control method, and a storage medium of the present invention will be described with reference to the drawings.

Overall Configuration

Figure 1:
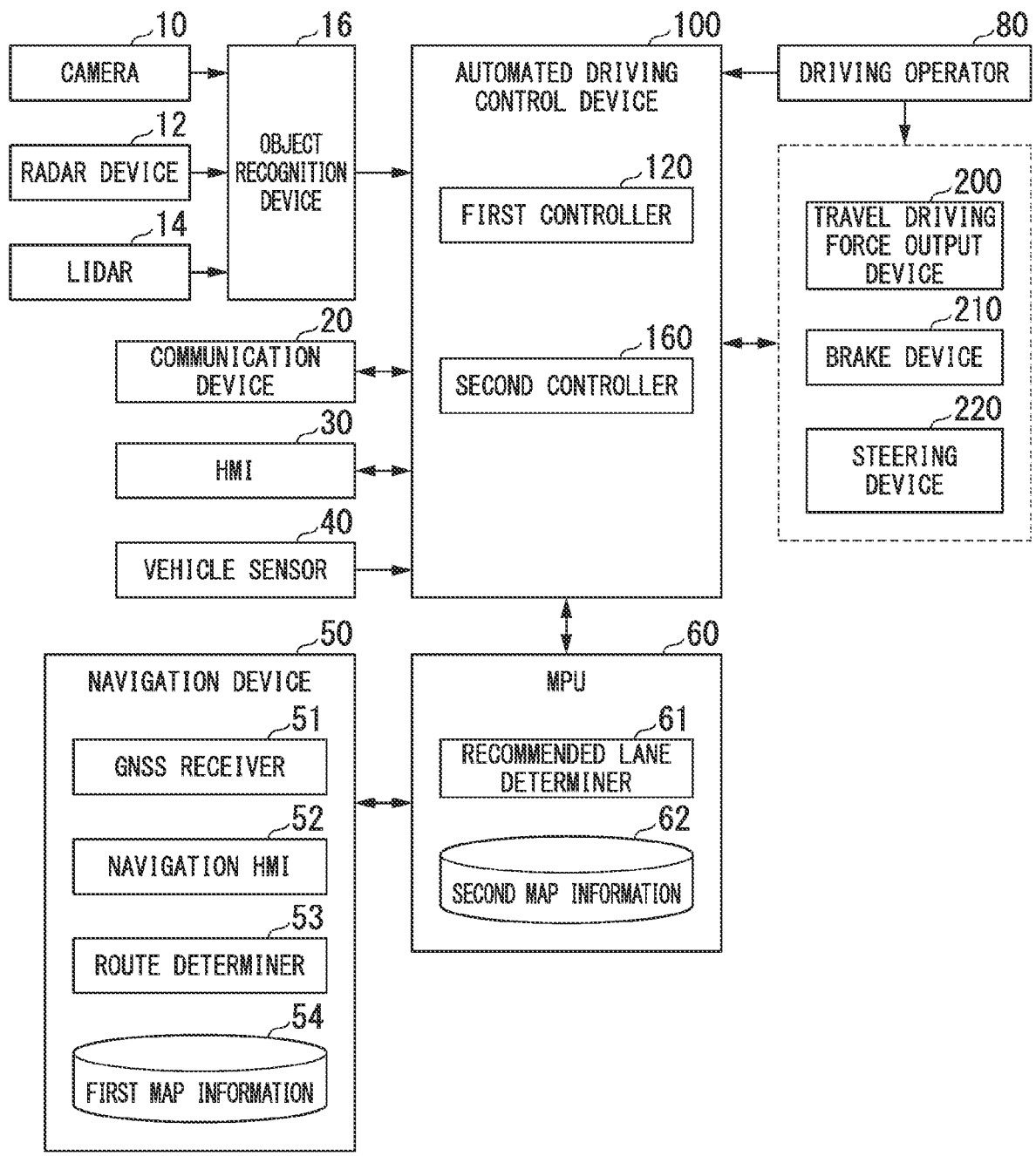
FIG. 1 is a configuration diagram of a vehicle system using a vehicle control device according to the present embodiment.

FIG. 1 is a configuration diagram of a vehicle system 1 using a vehicle control device according to an embodiment.

A vehicle, in which the vehicle system 1 is installed, is a vehicle with two wheels, three wheels, four wheels, and the like, for example, and its driving source is an internal combustion engine such as a diesel engine and a gasoline engine, an electric motor, or a combination thereof. The electric motor operates by using power generated by a generator connected to the internal combustion engine or power discharged from a secondary cell or a fuel cell.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driving operator 80, an automated driving control device 100, a travel driving force output device 200, a brake device 210, and a steering device 220. These devices and equipment are connected to one another via a multiplex communication line such as a controller area network (CAN) communication line, a serial communication line, a wireless communication network, and the like. The configuration shown in FIG. 1 is merely an example, and a part of the configuration may be omitted or other configurations may be added.

The camera 10 is, for example, a digital camera using a solid-state imaging element such as a charge coupled device (CCD) and a complementary metal oxide semiconductor (CMOS). The camera 10 is mounted at arbitrary places on the vehicle (hereinafter, referred to as a host vehicle M) in which the vehicle system 1 is installed. In the case of capturing an image of an area in front of the host vehicle M, the camera 10 is mounted on an upper part of a front windshield, on a rear surface of a rear-view mirror, and the like. The camera 10, for example, periodically and repeatedly captures the surroundings of the host vehicle M. The camera 10 may be a stereo camera.

The radar device 12 emits radio waves such as millimeter waves to the surroundings of the host vehicle M, detects radio waves (reflected waves) reflected by an object, and detects at least a position (a distance and an orientation) of the object. The radar device 12 is mounted at arbitrary places on the host vehicle M. The radar device 12 may detect the position and the speed of the object by a frequency modulated continuous wave (FM-CW) scheme.

The LIDAR 14 emits light (or electromagnetic waves having a wavelength close to that of light) to the surroundings of the host vehicle M and measures scattered light. The LIDAR 14 detects a distance to a target based on a time from light emission to light reception. The emitted light is a pulsed laser beam, for example. The LIDAR 14 is mounted at arbitrary places on the host vehicle M.

The object recognition device 16 performs a sensor fusion process on results of detection by some or all of the camera 10, the radar device 12, and the LIDAR 14, thereby recognizing the position, the type, the speed and the like of an object. The object recognition device 16 outputs a recognition result to the automated driving control device 100. The object recognition device 16 may output the detection results of the camera 10, the radar device 12, and the LIDAR 14 to the automated driving control device 100 as are. The object recognition device 16 may be omitted from the vehicle system 1.

The communication device 20 communicates with other vehicles present around the host vehicle M, or communicates with various server devices via a wireless base station by using, for example, a cellular network, a Wi-Fi network, Bluetooth (registered trademark), dedicated short range communication (DSRC) and the like.

The HMI 30 presents various types of information to an occupant of the host vehicle M and receives an input operation of the occupant. The HMI 30 includes various display devices, speakers, buzzers, touch panels, switches, keys, and the like.

The vehicle sensor 40 includes a vehicle speed sensor that detects the speed of the host vehicle M, an acceleration sensor that detects acceleration, a yaw rate sensor that detects an angular velocity around a vertical axis, a direction sensor that detects the orientation of the host vehicle M, and the like.

The navigation device 50 includes, for example, a global navigation satellite system (GNSS) receiver 51, a navigation HMI 52, and a route determiner 53. The navigation device 50 stores first map information 54 in a storage device such as a hard disk drive (HDD) and a flash memory. The GNSS receiver 51 specifies the position of the host vehicle M based on a signal received from a GNSS satellite. The position of the host vehicle M may be specified or complemented by an inertial navigation system (INS) using the output of the vehicle sensor 40. The navigation HMI 52 includes a display device, a speaker, a touch panel, keys, and the like. The navigation HMI 52 may be partially or entirely shared with the aforementioned HMI 30. The route determiner 53 determines, for example, a route (hereinafter, referred to as a route on a map) to a destination, which is input by an occupant using the navigation HMI 52, from the position of the host vehicle M specified by the GNSS receiver 51 (or any input position) with reference to the first map information 54. The first map information 54 is, for example, information in which a road shape is expressed by links indicating a road and nodes connected by the links. The first map information 54 may include a road curvature, point of interest (POI) information, and the like. The route on the map is output to the MPU 60. The navigation device 50 may provide route guidance using the navigation HMI 52 based on the route on the map. The navigation device 50 may be implemented by, for example, functions of a terminal device such as a smart phone and a tablet terminal owned by an occupant. The navigation device 50 may transmit the current position and the destination to a navigation server via the communication device 20, and acquire a route equivalent to the route on the map from the navigation server.

The MPU 60 includes, for example, a recommended lane determiner 61 and stores second map information 62 in a storage device such as an HDD and a flash memory. The recommended lane determiner 61 divides the route on the map provided from the navigation device 50 into a plurality of blocks (for example, divides the route on the map every 100 m in the vehicle travel direction), and determines a recommended lane for each block with reference to the second map information 62. The recommended lane determiner 61 determines which lane to travel from the left. When there is a branch point on the route on the map, the recommended lane determiner 61 determines a recommended lane such that the host vehicle M can travel on a reasonable route for traveling to a branch destination.

The second map information 62 is more accurate map information than the first map information 54. The second map information 62 includes, for example, information on the center of a lane, information on the boundary of the lane, and the like. The second map information 62 may include road information, traffic regulation information, address information (address and postal code), facility information, telephone number information, and the like. The second map information 62 may be updated at any time by the communication device 20 communicating with another device.

The driving operator 80 includes, for example, an accelerator pedal, a brake pedal, a shift lever, a steering wheel, a deformed steering wheel, a joy stick, and other operators. The driving operator 80 is provided with a sensor for detecting an operation amount or the presence or absence of an operation, and its detection result is output to the automated driving control device 100, or some or all of the travel driving force output device 200, the brake device 210, and the steering device 220.

The automated driving control device 100 includes, for example, a first controller 120 and a second controller 160. Each of the first controller 120 and the second controller 160 is implemented by, for example, a hardware processor such as a central processing unit (CPU) executing a program (software). Some or all of these components may be implemented by hardware (a circuit unit: including circuitry) such as a large scale integration (LSI), an application specific integrated circuit (ASIC), a field-programmable gate array (FPGA), and a graphics processing unit (GPU), or may be implemented by software and hardware in cooperation. The program may be stored in advance in a storage device (storage device including a non-transitory storage medium) such as an HDD and a flash memory of the automated driving control device 100, or may be installed in the HDD and the flash memory of the automated driving control device 100 when a detachable storage medium (non-transitory storage medium) storing the program, such as a DVD and a CD-ROM, is mounted on a drive device. The combination of the object recognition device 16 and the automated driving control device 100 is an example of a "vehicle control device", and the combination of an action plan generator 140 and the second controller 160 is an example of a "driving controller".

Figure 2:
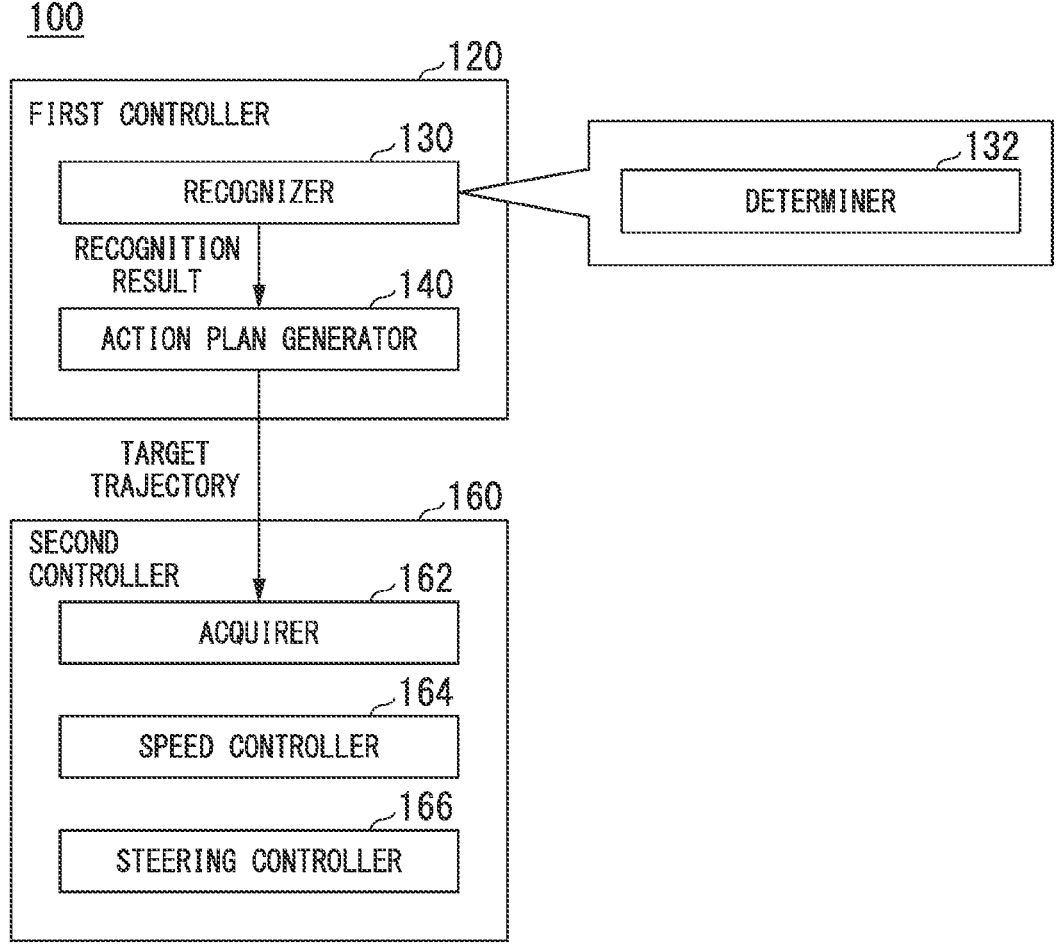
FIG. 2 is a functional configuration diagram of a first controller and a second controller.

FIG. 2 is a functional configuration diagram of the first controller 120 and the second controller 160. The first controller 120 includes, for example, a recognizer 130 and an action plan generator 140. The first controller 120 performs, for example, a function based on an artificial intelligence (AI) and a function based on a predetermined model in parallel. For example, a function of "recognizing an intersection" may be implemented by performing intersection recognition by deep learning and the like and recognition based on a predetermined condition (pattern matching signals, road markings, and the like) in parallel, and scoring both recognition and comprehensively evaluating them. In this way, the reliability of automated driving is ensured.

The recognizer 130 recognizes a state such as the position, speed, acceleration and the like of an object around the host vehicle M based on information input from the camera 10, the radar device 12, and the LIDAR 14 via the object recognition device 16. The position of the object is recognized as, for example, a position on absolute coordinates with a representative point (center of gravity, the center of the drive axis, and the like) of the host vehicle M as the origin, and is used for control. The position of the object may be represented by a representative point of the center of gravity, a corner, and the like of the object, or may be represented by an area. The "state" of the object may include an acceleration, a jerk, or an "action state" (for example, whether a lane change is being performed or is intended to be performed) of the object.

Furthermore, the recognizer 130 recognizes, for example, a lane (a travel lane) in which the host vehicle M is traveling. For example, the recognizer 130 compares a pattern (for example, an arrangement of solid lines and broken lines) of road division lines obtained from the second map information 62 with a pattern of road division lines around the host vehicle M, which is recognized from the image captured by the camera 10, thereby recognizing the travel lane. The recognizer 130 may recognize the travel lane by recognizing not only the road division lines but also a traveling road boundary (road boundary) including the road division lines, a road shoulder, a curb, a median strip, a guardrail, and the like. In this recognition, the position of the host vehicle M acquired from the navigation device 50 or a processing result of the INS may be taken into consideration. Furthermore, the recognizer 130 recognizes a temporary stop line, an obstacle, a red light, a tollgate, and other road events.

When recognizing the travel lane, the recognizer 130 recognizes the position and the orientation of the host vehicle M with respect to the travel lane. The recognizer 130, for example, may recognize, as the relative position and the orientation of the host vehicle M with respect to the travel lane, a deviation of a reference point of the host vehicle M from a center of a lane and an angle formed between the traveling direction of the host vehicle M and a line connecting the center of the lane. Instead of this, the recognizer 130 may recognize the position and the like of the reference point of the host vehicle M with respect to any one of the side ends (the road division line or the road boundary) of the travel lane as the relative position of the host vehicle M with respect to the travel lane. In the present embodiment, the recognizer 130 further includes a determiner 132, but details of the functions thereof will be described below.

The action plan generator 140 generates a target trajectory along which the host vehicle M will travel in the future automatically (independent of a driver's operation) to be able to travel in the recommended lane determined by the recommended lane determiner 61 in principle and further to cope with surrounding situations of the host vehicle M. The target trajectory includes, for example, a speed element. For example, the target trajectory is represented as a sequence of points (trajectory points) to be reached by the host vehicle M. The trajectory point is a point that the host vehicle M is to reach every predetermined travel distance (for example, about several meters) along a road, and a target speed and a target acceleration at every predetermined sampling time (for example, about several tenths of a [sec]) are separately generated as a part of the target trajectory. Furthermore, the trajectory point may be a position that the host vehicle M is to reach at the sampling time for each predetermined sampling time. In such a case, information on the target speed and the target acceleration is represented by the interval between the trajectory points.

When generating the target trajectory, the action plan generator 140 may set events for automated driving. The events for automated driving include constant-speed travel events, low-speed following travel events, lane change events, branching events, merge events, takeover events, and the like. The action plan generator 140 generates the target trajectory according to an activated event.

The second controller 160 controls the travel driving force output device 200, the brake device 210, and the steering device 220 such that the host vehicle M passes along the target trajectory generated by the action plan generator 140 at scheduled times.

Referring now back to FIG. 2, the second controller 160 includes, for example, an acquirer 162, a speed controller 164, and a steering controller 166. The acquirer 162 acquires information on the target trajectory (trajectory points) generated by the action plan generator 140 and stores the information in a memory (not shown). The speed controller 164 controls the travel driving force output device 200 or the brake device 210 based on a speed element associated with the target trajectory stored in the memory. The steering controller 166 controls the steering device 220 according to the degree of bending of the target trajectory stored in the memory. The processes of the speed controller 164 and the steering controller 166 are implemented by, for example, a combination of feedforward control and feedback control. As an example, the steering controller 166 performs a combination of feedforward control according to the curvature of a road in front of the host vehicle M and feedback control based on a deviation from the target trajectory.

The travel driving force output device 200 outputs a travel driving force (torque) for driving the vehicle to driving wheels. The travel driving force output device 200 includes, for example, a combination of an internal combustion engine, an electric motor, a transmission and the like, and an electronic controller (ECU) for controlling them. The ECU controls the aforementioned configuration according to information input from the second controller 160 or information input from the driving operator 80.

The brake device 210 includes, for example, a brake caliper, a cylinder for transferring hydraulic pressure to the brake caliper, an electric motor for generating the hydraulic pressure in the cylinder, and a brake ECU. The brake ECU controls the electric motor according to the information input from the second controller 160 or the information input from the driving operator 80, thereby allowing a brake torque corresponding to a brake operation to be output to each wheel. The brake device 210 may have a backup mechanism for transferring the hydraulic pressure generated by an operation of the brake pedal included in the driving operator 80 to the cylinder via a master cylinder. The brake device 210 is not limited to the aforementioned configuration and may be an electronically controlled hydraulic pressure brake device that controls an actuator according to the information input from the second controller 160, thereby transferring the hydraulic pressure of the master cylinder to the cylinder.

The steering device 220 includes, for example, a steering ECU and an electric motor. The electric motor, for example, changes an orientation of a steering wheel by allowing a force to act on a rack and pinion mechanism. The steering ECU drives the electric motor according to the information input from the second controller 160 or the information input from the driving operator 80, thereby changing the orientation of the steering wheel.

Operation

Figure 3:
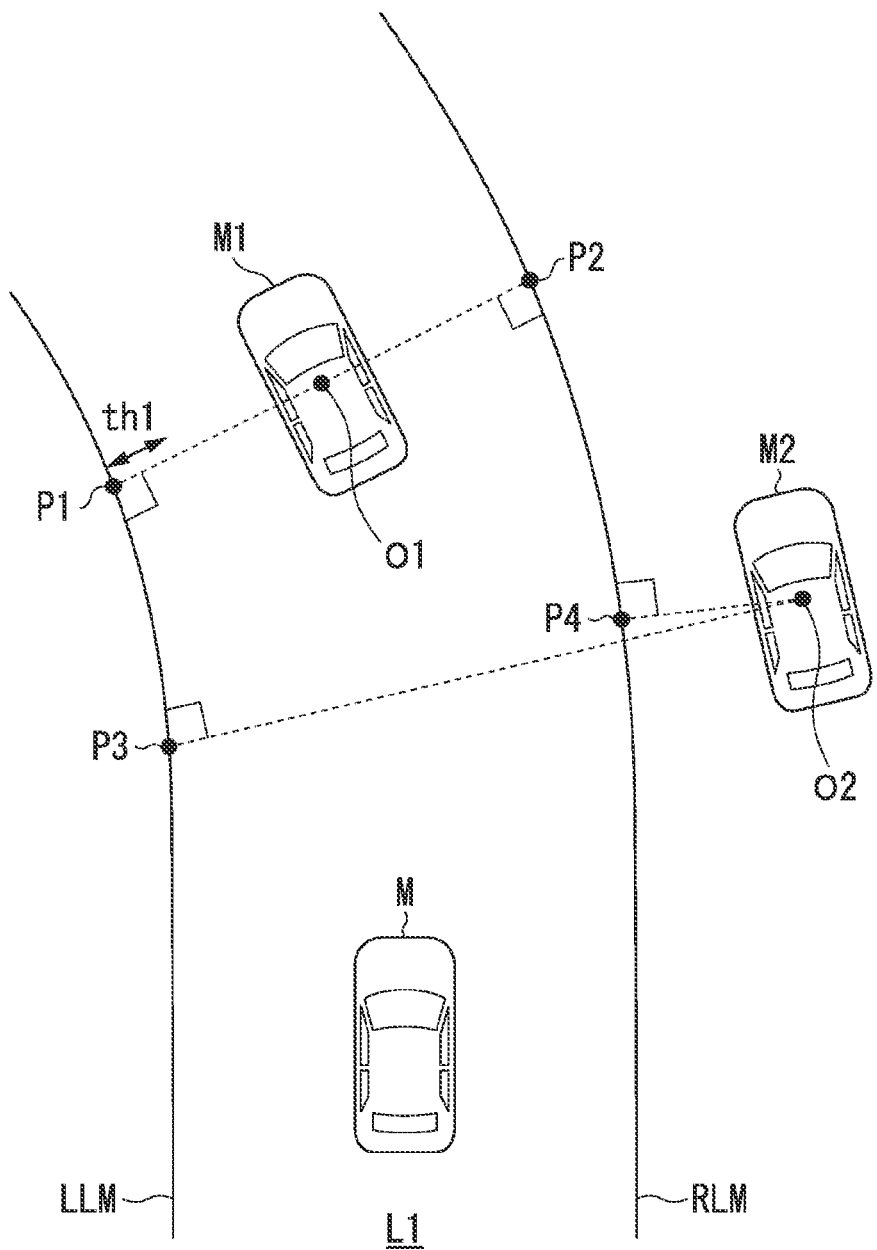
FIG. 3 is a diagram showing an example of a scene in which processing of the vehicle control device is performed.

Next, processing of the vehicle control device according to the present embodiment will be described with reference to FIG. 3. FIG. 3 is a diagram showing an example of a scene in which processing of the vehicle control device is performed. In FIG. 3, the host vehicle M is traveling in a lane L1, and another vehicle M1 and another vehicle M2 are traveling in front of the host vehicle M. The recognizer 130 of the host vehicle M recognizes the surrounding situation of the host vehicle M including road division lines (left road division line LLM and right road division line RLM) and a surrounding vehicle (another vehicle M1 and another vehicle M2), and the action plan generator 140 generates a target trajectory of the host vehicle M based on the recognized surrounding situation (including at least the road division line). The second controller 160 controls the steering and acceleration/deceleration of the host vehicle M without depending on the operation of a driver of the host vehicle M so that the host vehicle M travels along the target trajectory generated by the action plan generator 140. In the following description, the left road division line LLM and the right road division line RLM may be collectively referred to as road division lines LM.

As described above, the host vehicle M refers to at least the road division lines LM of the travel lane L1 when traveling by automated driving, but when the another vehicle M1 and the another vehicle M2 travel to cross the road division line LM, occlusion, in which at least a part of the road division line LM is shielded, occurs. When occlusion occurs, information on the road division line LM recognized by the recognizer 130 may not be sufficient, which may hinder the traveling of the host vehicle M. The present invention is related to such an event.

The determiner 132 determines whether occlusion has occurred, based on the road division line LM recognized by the recognizer 130 and the position of the surrounding vehicle (the another vehicle M1 and the another vehicle M2) present in front of the host vehicle M. More specifically, the determiner 132 determines whether a distance (hereinafter, may be referred to as a reference distance) between the surrounding vehicle (the another vehicle M1 and the another vehicle M2) and the road division line LM is equal to or smaller than a first threshold th1, and determines whether occlusion has occurred, based on whether the reference distance is equal to or smaller than the first threshold th1. In such a case, the first threshold th1 is such a short distance that it is assumed that the surrounding vehicle may be shielding at least a part of the road division line LM.

At this time, the determiner 132 converts the surrounding situation recognized by the recognizer 130 into coordinate points on an assumed plane virtually viewed from the sky, defines a perpendicular line to the road division line LM from the surrounding vehicle (the another vehicle M1 and the another vehicle M2) on the assumed plane, and uses the length of the perpendicular line as the reference distance. For example, in FIG. 3, the determiner 132 defines a perpendicular line to the road division line LLM from a representative point O1 (center of gravity, drive shaft center, and the like) of the another vehicle M1, and sets an intersection point between the perpendicular line and the road division line LLM as P1. Next, the determiner 132 calculates a reference distance between the representative point O1 and the intersection point P1, and determines whether the calculated reference distance is equal to or smaller than the first threshold th1. Similarly, the determiner 132 defines a perpendicular line to the road division line RLM from the representative point O1, and sets an intersection point between the perpendicular line and the road division line RLM as P2. Next, the determiner 132 calculates a reference distance between the representative point O1 and the intersection point P2, and determines whether the calculated reference distance is equal to or smaller than the first threshold th1. When it is determined that at least one of the two calculated reference distances is equal to or smaller than the first threshold th1, the determiner 132 sets another vehicle dividing line approach flag flag1 to ON. When the another vehicle dividing line approach flag flag1 is set to ON, the first threshold th1 may be updated to a smaller value for a certain period of time. This can prevent hunting that occurs when another vehicle is traveling at a position close to a distance corresponding to the first threshold th1 from the road division line LM.

The another vehicle M1 is another vehicle that is traveling in the lane L1 like the host vehicle M, but the determiner 132 may also perform the same process for another vehicle that is traveling outside the lane L1, that is, the another vehicle M2. Specifically, the determiner 132 defines a perpendicular line to the road division line LLM from a representative point O2 of the another vehicle M2, and sets an intersection point between the perpendicular line and the road division line LLM as P3. Next, the determiner 132 calculates a reference distance between the representative point O2 and the intersection point P3, and determines whether the calculated reference distance is equal to or smaller than the first threshold th1. Similarly, the determiner 132 defines a perpendicular line to the road division line RLM from the representative point O2, and sets an intersection point between the perpendicular line and the road division line RLM as P4. Next, the determiner 132 calculates a reference distance between the representative point O2 and the intersection point P4, and determines whether the calculated reference distance is equal to or smaller than the first threshold th1. When it is determined that at least one of the two calculated reference distances is equal to or smaller than the first threshold th1, the determiner 132 sets the another vehicle dividing line approach flag flag1 to ON. When the recognizer 130 determines that another vehicle that is traveling outside the lane L1, the determiner 132 may also perform the above process only for the road division line LM close to the another vehicle.

The determiner 132 further calculates the degree of deviation indicating a deviation between the road division line LM currently recognized by the recognizer 130 and the road division line LM recognized in the past by the recognizer 130, and determines whether the degree of deviation is equal to or more than a second threshold th2. The "current" means a "current control cycle" in a control cycle (for example, several milliseconds) in which the recognizer 130 recognizes the surrounding situation, and the "past" means a "previous control cycle". Moreover, the degree of deviation means the degree of non-matching between a road division line recognized in the current control cycle and a road division line recognized in the previous control cycle, and more specifically, for example, means the ratio of an area where the two road division lines do not match to the total area of the two road division lines (distance traveled by the host vehicle M is also considered). When it is determined that the degree of deviation is equal to or more than the second threshold th2, the determiner 132 sets a dividing line shape abnormality flag flag2 to ON. When the dividing line shape abnormality flag flag2 is set to ON, the second threshold th2 may be updated to a smaller value for a certain period of time. This can prevent hunting that occurs when the degree of deviation between the road division line LM currently recognized and the road division line LM recognized in the past is close to a threshold.

Figure 4:
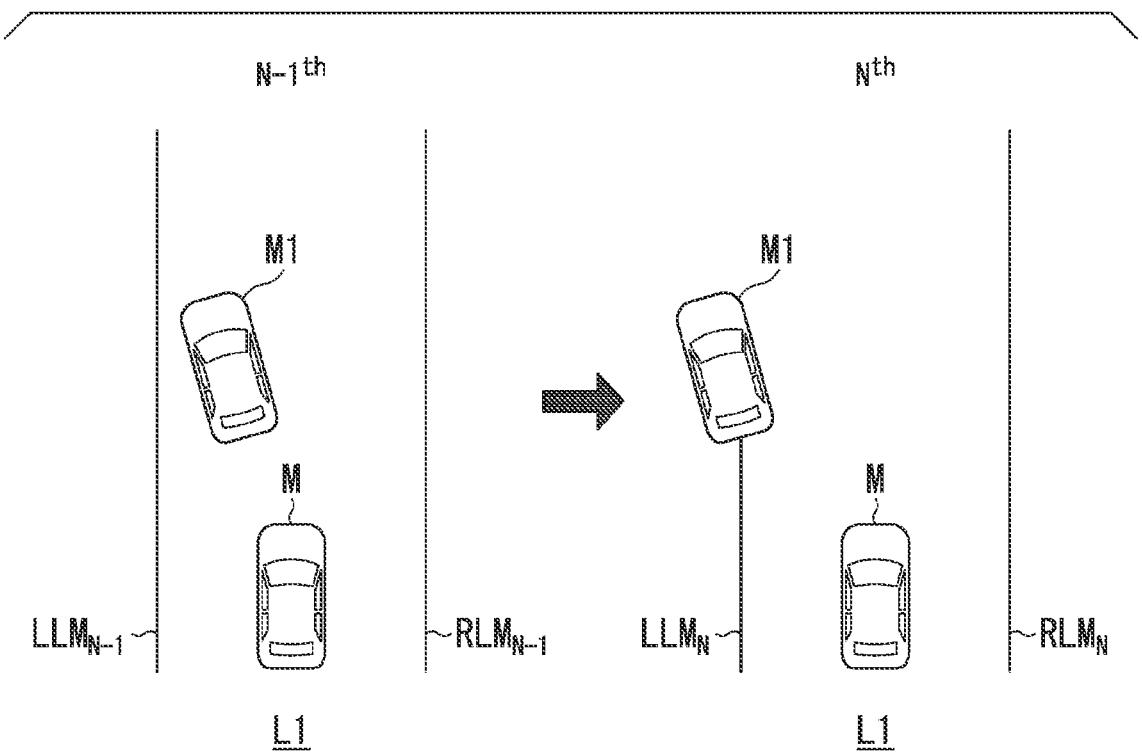
FIG. 4 is a diagram showing an example of a scene in which a determiner calculates the degree of deviation between road division lines.

FIG. 4 is a diagram showing an example of a scene in which the determiner 132 calculates the degree of deviation of the road division line LM. In FIG. 4, $LLM_{N-1}$ indicates a left road division line recognized by the recognizer 130 in an $N-1^{th}$ control cycle (N is an arbitrary integer of 2 or more), $RLM_{N-1}$ indicates a right road division line recognized by the recognizer 130 in the $N-1^{th}$ control cycle, $LLM_N$ indicates a left road division line recognized by the recognizer 130 in an $N^{th}$ control cycle, and $RLM_N$ indicates a right road division line recognized by the recognizer 130 in the $N^{th}$ control cycle. As shown in the right part of FIG. 4, since the another vehicle M1 is traveling on the road division line $LLM_N$ in the $N^{th}$ control cycle, a part of the road division line $LLM_N$ recognized by the recognizer 130 is shielded.

In the $N^{th}$ control cycle, the determiner 132 calculates the degree of deviation between the road division line $LLM_{N-1}$ and the road division line $LLM_N$ and the degree of deviation between the road division line $RLM_{N-1}$ and the road division line $RLM_N$, and determines whether these degrees of deviation are equal to or more than the second threshold th2. In the case of FIG. 4, the determiner 132 determines that the degree of deviation between the road division line $LLM_{N-1}$ and the road division line $LLM_N$ is equal to or more than the second threshold th2, and sets the dividing line shape abnormality flag flag2 to ON.

When it is determined that the reference distance is equal to or smaller than the first threshold th1 and the degree of deviation is equal to or more than the second threshold th2, the determiner 132 determines that occlusion has occurred. The reason for using both the reference distance and the degree of deviation in determining the occurrence of occlusion is because it is not possible to confirm that occlusion has actually occurred in the recognized road division line LM when only the reference distance is used, and it is not possible to confirm that the cause of not being able to acquire a part of the road division line LM is the occlusion due to another vehicle when only the degree of deviation is used (for example, it may not be possible to acquire a part of the road division line LM due to a malfunction of the camera 10). The use of both the reference distance and the degree of deviation makes it possible to more reliably determine the occurrence of occlusion.

Figure 5:
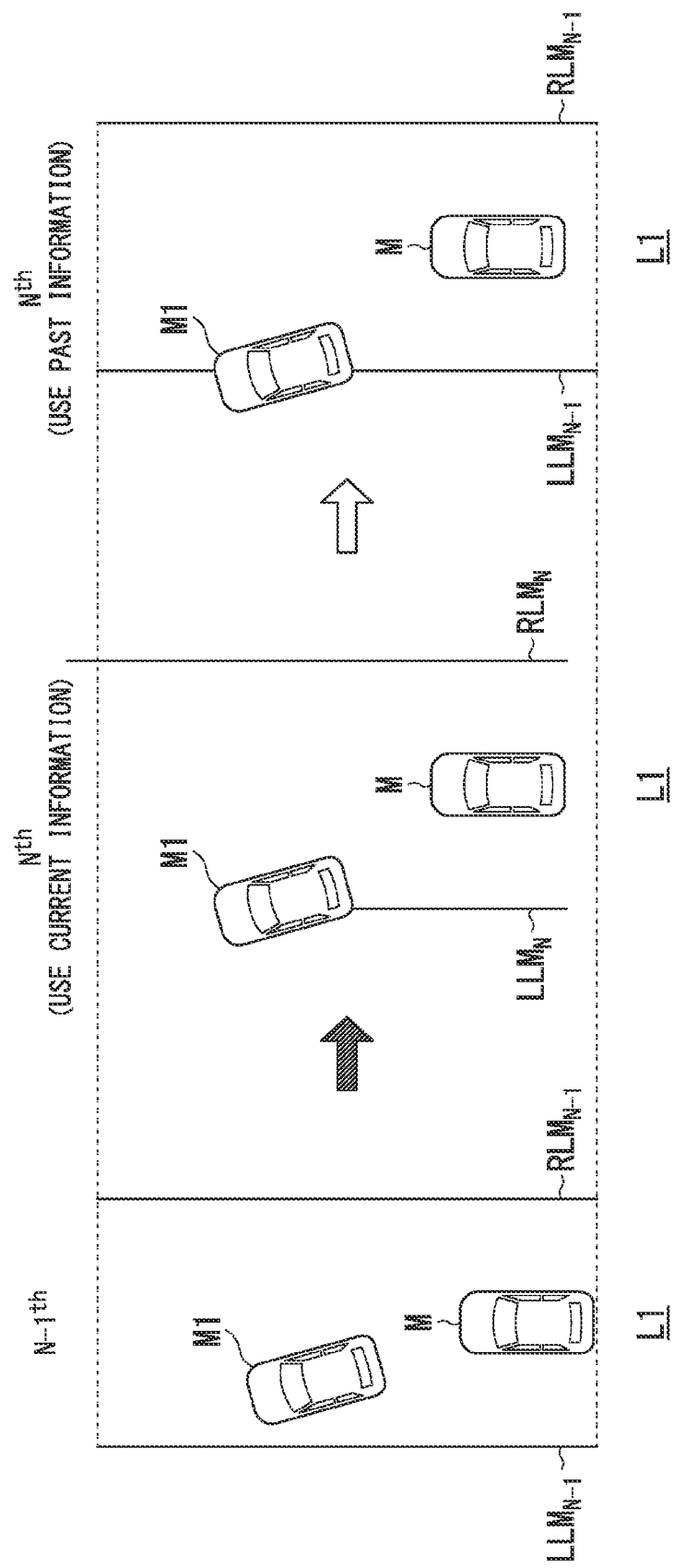
FIG. 5 is a diagram showing an example of a scene in which a road division line recognized in the past by a recognizer is used.

When it is determined by the determiner 132 that occlusion has occurred, the action plan generator 140 generates a target trajectory based on the road division line LM recognized in the past by the recognizer 130, and the second controller 160 controls the steering and acceleration/deceleration of the host vehicle M so that the host vehicle M travels along the target trajectory generated by the action plan generator 140. FIG. 5 is a diagram showing an example of a scene in which the road division line LM recognized in the past by the recognizer 130 is used. As shown in the central part of FIG. 5, as in the case of FIG. 4, since the another vehicle M1 is traveling on the road division line $LLM_N$ in the $N^{th}$ control cycle, a part of the road division line $LLM_N$ recognized by the recognizer 130 is shielded.

In the case of the central part of FIG. 5, the determiner 132 determines that the reference distance is equal to or smaller than the first threshold th1 and the degree of deviation is equal to or more than the second threshold th2, thereby determining that occlusion has occurred. Next, as shown in the right part of FIG. 5, the action plan generator 140 generates a target trajectory by using the road division line $LLM_{N-1}$ and the road division line $RLM_{N-1}$ in the previous control cycle not determined to have occlusion, instead of the road division line $LLM_N$ and the road division line $RLM_N$. When the road division line $LLM_{N-1}$ in the previous control cycle is used, a recognizable distance of the road division line is shortened by a distance traveled by the host vehicle M during the period from the previous control cycle to the current control cycle. However, it can be utilized for automated driving as a road division line having a longer distance as compared to a case of using the road division line $LLM_N$ for which it has been determined that occlusion has occurred. In the above description, when it is determined that occlusion has occurred on one side of a road division line, information of the previous control cycle is used for road division lines on both sides, but alternatively, the information of the previous control cycle may be used only for a road division line for which it has been determined that occlusion has occurred.

Flow of Operation

Figure 6:
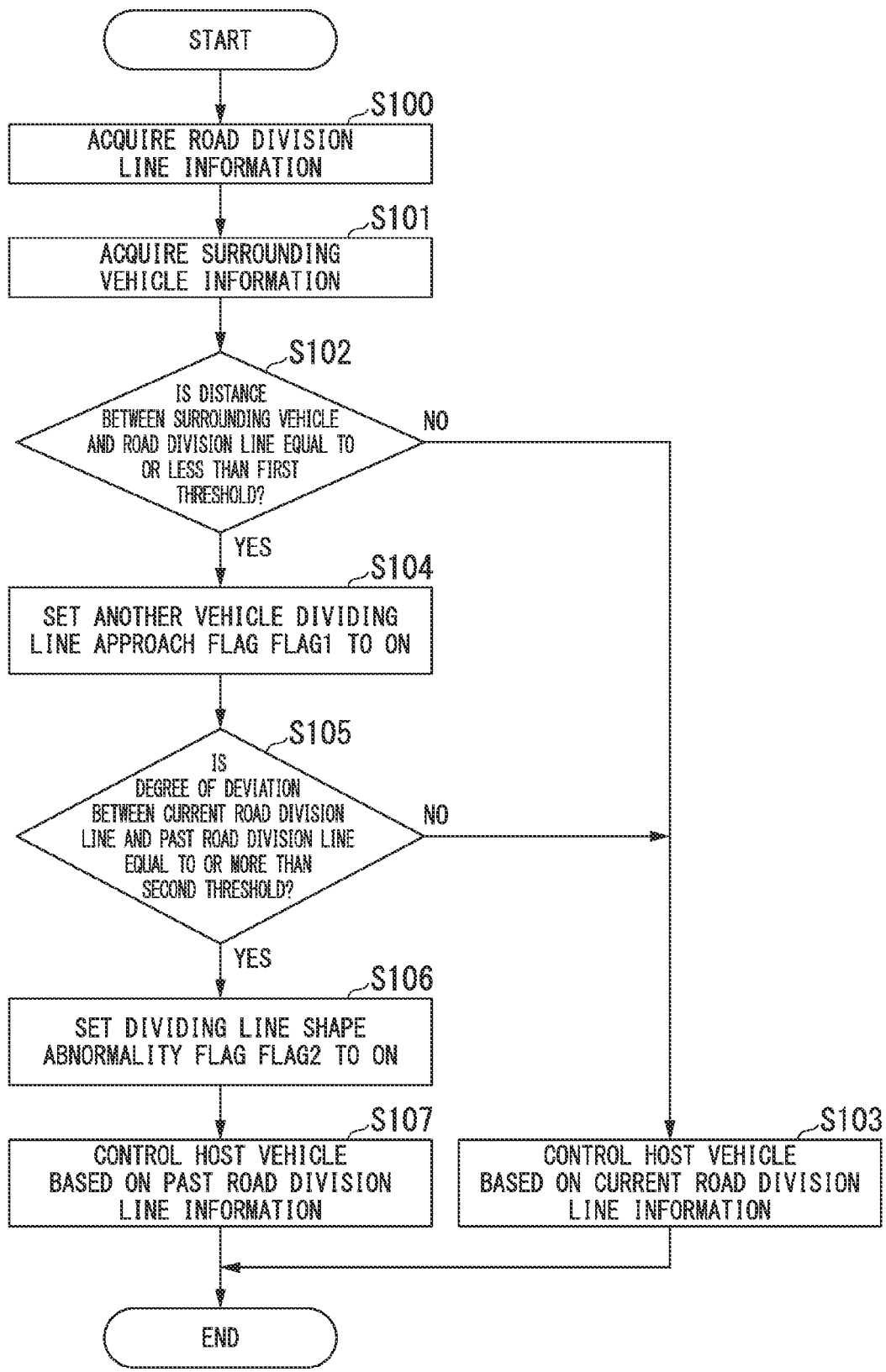
FIG. 6 is a flowchart showing an example of a processing flow performed by the vehicle control device.

Next, a processing flow performed by the vehicle control device will be described with reference to FIG. 6. FIG. 6 is a flowchart showing an example of a processing flow performed by the vehicle control device. First, the recognizer 130 acquires road division line information of a lane in which the host vehicle M travels (step S100). Next, the recognizer 130 acquires surrounding vehicle information on a surrounding vehicle present in the vicinity of the host vehicle M (step S101).

Next, the determiner 132 determines whether a reference distance between the surrounding vehicle indicated by the surrounding vehicle information and a road division line indicated by the road division line information is equal to or less than the first threshold th1 (step S102). More specifically, the determiner 132 calculates a reference distance for each of a left road division line and a right road division line, and determines whether at least one of the two reference distances is equal to or less than the first threshold th1. When it is determined that the reference distance is not equal to or less than the first threshold th1, the driving controller controls the traveling of the host vehicle M based on the current road division line information acquired in step S100 (step S103). When it is determined that the reference distance is equal to or less than the first threshold th1, the determiner 132 sets the another vehicle dividing line approach flag flag1 to ON (step S104).

Next, the determiner 132 determines whether the degree of deviation between a road division line indicated by the current road division line information and a road division line indicated by past road division line information is equal to or more than the second threshold th2 (step S105). More specifically, the determiner 132 calculates the degree of deviation for each of the left road division line and the right road division line, and determines whether at least one of the two degrees of deviation is equal to or more than the second threshold th2. When it is determined that the degree of deviation is not equal to or more than the second threshold th2, the driving controller controls the traveling of the host vehicle M based on the current road division line information acquired in step S100. On the other hand, when it is determined that the degree of deviation is equal to or more than the second threshold th2, the determiner 132 sets the dividing line shape abnormality flag flag2 to ON (step S106). Next, the driving controller controls the traveling of the host vehicle M based on the past road division line information (step S107). In this way, the process of the present flowchart ends.

In the above flowchart, the determiner 132 may determine whether the side determined that the reference distance is equal to or less than the first threshold th1 matches the side determined that the degree of deviation is equal to or more than the second threshold th2, and control the traveling of the host vehicle M based on the past road division line information only when both sides match with each other.

According to the present embodiment described above, it is determined whether occlusion has occurred, based on a reference distance between a surrounding vehicle and a road division line and the degree of deviation between a current road division line and a past road division line, and when it is determined that the occlusion has occurred, the control of a host vehicle is performed based on information on the past road division line. This makes it possible to improve the accuracy of recognition of the road division line when the surrounding vehicle enters a lane in which the host vehicle travels.

The embodiment described above can be expressed as follows.

A vehicle control device including a storage device configured to store a program and a hardware processor, in which the hardware processor executes the program stored in the storage device to recognize a surrounding situation of a vehicle including a road division line and a surrounding vehicle, to control steering and acceleration/deceleration of the vehicle based on at least the road division line without depending on an operation of a driver of the vehicle, and to determine whether occlusion, in which at least a part of the road division line is shielded, has occurred, based on the road division line and a position of the surrounding vehicle present in front of the vehicle.

Although a mode for carrying out the present invention has been described using the embodiments, the present invention is not limited to these embodiments and various modifications and substitutions can be made without departing from the spirit of the present invention.

What is claimed is:

1. A vehicle control device comprising:
a storage device configured to store a program; and
a hardware processor,
wherein the hardware processor executes the program stored in the storage device to recognize a surrounding situation of a vehicle including a road division line and a surrounding vehicle, to control steering and acceleration/deceleration of the vehicle based on at least the road division line without depending on an operation of a driver of the vehicle, and to determine whether occlusion, in which at least a part of the road division line is shielded, has occurred, based on the road division line and a position of the surrounding vehicle present in front of the vehicle,
wherein, when it is determined that the occlusion has occurred, the hardware processor controls the steering and the acceleration/deceleration of the vehicle, based on the road division line recognized in the past, and
wherein the hardware processor calculates a degree of deviation indicating a deviation between the road division line currently recognized and the road division line recognized in the past, and determines whether occlusion has occurred based further on the degree of deviation.

2. The vehicle control device according to claim 1, wherein the hardware processor determines whether a distance between the surrounding vehicle and the road division line is equal to or smaller than a first threshold, and determines whether the occlusion has occurred, based on whether the distance is equal to or smaller than the first threshold.

3. The vehicle control device according to claim 2, wherein the hardware processor defines a perpendicular line to the road division line from the surrounding vehicle on an assumed plane virtually viewed from the sky, and uses a length of the perpendicular line as the distance.

4. The vehicle control device according to claim 2, wherein the hardware processor calculates a degree of deviation indicating a deviation between the road division line currently recognized and the road division line recognized in the past, and determines that the occlusion has occurred when the distance is equal to or smaller than the first threshold and the degree of deviation is equal to or more than a second threshold.

5. A vehicle control method implemented by a computer that recognizes a surrounding situation of a vehicle including a road division line and a surrounding vehicle, controls steering and acceleration/deceleration of the vehicle based on at least the road division line without depending on an operation of a driver of the vehicle, and determines whether occlusion, in which at least a part of the road division line is shielded, has occurred, based on the road division line and a position of the surrounding vehicle present in front of the vehicle, wherein when it is determined that the occlusion has occurred, the computer controls the steering and the acceleration/deceleration of the vehicle, based on the road division line recognized in the past, and wherein the computer calculates a degree of deviation indicating a deviation between the road division line currently recognized and the road division line recognized in the past, and determines whether occlusion has occurred based further on the degree of deviation.

6. A non-transitory computer readable storing medium storing a program causing a computer to recognize a surrounding situation of a vehicle including a road division line and a surrounding vehicle, to control steering and acceleration/deceleration of the vehicle based on at least the road division line without depending on an operation of a driver of the vehicle, and to determine whether occlusion, in which at least a part of the road division line is shielded, has occurred, based on the road division line and a position of the surrounding vehicle present in front of the vehicle, wherein when it is determined that the occlusion has occurred, the program causes the computer to control the steering and the acceleration/deceleration of the vehicle, based on the road division line recognized in the past, and wherein the program causes the computer to calculate a degree of deviation indicating a deviation between the road division line currently recognized and the road division line recognized in the past, and determines whether occlusion has occurred based further on the degree of deviation.

* * * * *